US00H002098H

(19) United States

(12) Statutory Invention Registration

Morin

(10) Reg. No.: US H2098 H

(43) Published: Mar. 2, 2004

(54) MULTILINGUAL COMMUNICATIONS DEVICE

(75) Inventor: Lee M. E. Morin, Pensacola, FL (US)

(73) Assignee: The United States of America as represented by the Secretary of the Navy, Washington, DC (US)

(21) Appl. No.: 08/200,049

(22) Filed: Feb. 22, 1994

(65) Prior Publication Data

US 2003/0036911 A1 Feb. 20, 2003

(51) Int. Cl.[7] ..... G06F 17/28

(52) U.S. Cl. ..... 704/2

(58) Field of Search ..... 364/413.01, 413.02, 364/413.03, 419.01, 419.02, 419.03, 419.04, 419.07; 395/2.86, 2.87; 434/319, 321, 308, 318, 157, 169, 185; 707/1, 2, 3, 4, 7, 271, 270, 277, 278; 704/1, 277, 2

(56) References Cited

U.S. PATENT DOCUMENTS

| | | | | | |
|---|---|---|---|---|---|
| 4,428,733 | A | | 1/1984 | Kumat-Misir | |
| 4,493,050 | A | * | 1/1985 | Hashimoto et al. | 364/419.03 |
| 4,593,356 | A | * | 6/1986 | Hashimoto et al. | 364/419.07 |
| 4,613,944 | A | * | 9/1986 | Hashimoto et al. | |
| 4,843,589 | A | | 6/1989 | Yoshida et al. | |
| 4,882,681 | A | * | 11/1989 | Brotz | |
| 4,984,177 | A | | 1/1991 | Rondel et al. | |
| 5,010,495 | A | * | 4/1991 | Willetts | 364/419.03 |
| 5,056,145 | A | | 10/1991 | Yamamoto et al. | |
| 5,063,534 | A | * | 11/1991 | Kishimoto | 364/419.07 |
| 5,065,317 | A | * | 11/1991 | Hiramatsu et al. | 364/419.01 |
| 5,091,876 | A | | 2/1992 | Kumano et al. | |
| 5,341,291 | A | * | 8/1994 | Roizen et al. | 364/413.02 |
| 5,375,164 | A | * | 12/1994 | Jennings | 364/419.01 |
| 5,384,701 | A | * | 1/1995 | Stentiford et al. | 364/419.03 |
| 5,523,946 | A | * | 6/1996 | Kaplan et al. | 704/2 |

OTHER PUBLICATIONS

Wurst, Brooke E. "PC Interpreter topple the tower of babble. (Evaluation)", Nov. 1992, Computer Shopper, v12, n11, p950(2).*

Cowart, R., "Mastering Windows 3.1" pp. 516–518 Sybex Inc. 1993.*

Operator's Guide—Morin Multimedia Medical Translator Release 2.0 (1993) (by the inventor).

* cited by examiner

*Primary Examiner*—Michael J. Carone

*Assistant Examiner*—M. Thomson

(74) *Attorney, Agent, or Firm*—Philip E. Ketner; Barry A. Edelberg; Joseph K. Hemby

(57) ABSTRACT

A computer-based device for providing spoken translations of a predetermined set of medical questions, upon the selection of individual questions. Translations are prerecorded into a number of languages, and the physician user, in cooperation with the patient, chooses the language into which the translations are made. Then the physician chooses the questions in the physician's own language that should be asked, then indicates his choice to the device, and the device speaks the corresponding questions in the language of a potential respondent.

17 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTILINGUAL COMMUNICATIONS DEVICE

GOVERNMENT INTEREST

The invention described herein may be manufactured, used, and/or licensed by or for the United States Government for governmental purposes without the payment of any royalties thereon.

BACKGROUND OF THE INVENTION

Field of the Invention

This invention provides a method and apparatus for providing interpretation into a chosen one of a plurality of languages for a structured interview, especially the type of interview done by a medical professional (hereafter called the physician, the operator, or the user) with a patient-who does not share a common language, without the necessity of a human interpreter, and without the necessity of the person being interviewed (hereafter called the patient or the respondent) being able to read or write in any language. The terms translation and interpretation are used interchangeably herein.

Medical history taking, physical examination, diagnostic procedures, and treatment all involve verbal communication to some degree. With rapid world-wide travel now being common, patients are often presented to physicians for care who do not have a common language with the physicians. While it is in this context that the inventor approached the problem, the invention could also be used between confessor and penitent, waiter and customer, hotel desk clerk and international customers, or in other situations where multiple unknown languages must be dealt with.

The use of a human interpreter is a good solution to the physician/patient interview, but it has drawbacks. An interpreter may not be available. It may not even be initially clear what language the patient speaks. Interpreters often interfere with the interview process. They may inject their usually poor medical judgment into the interview, or they may be embarrassed by or embarrass the patient with probing personal questions. If the translator is a relative of the patient, embarrassment or outright fabrication of answers may result.

Description of the Prior Art

In the prior art, phrase books have been used, and a large set of these for many different languages have been compiled by the United States Department of Defense. These have their drawbacks. Where they are written for the physician to attempt to pronounce a transliteration into a language that the physician is not familiar with, they frequently result in lack of understanding. Pointing to a written phrase in a phrase book requires that the patient be literate, and it is often slow.

In U.S. Pat. No. 4,428,733 to Kumat-Misir, a series of question and answer sheets are provided in two languages, with answers given in one language being generally understandable by reference to sheets in the second language. This would be slow, would require a literate patient, and would not allow the physician to choose the next question based upon the response to the previous question.

There have been efforts, such as represented in U.S. Pat. No. 4,984,117 to Rondel et al, to provide a number of phrases and sentences in a single foreign language, with provision for the user to attempt in his own language to select one or more of those phrases, and if his selection is recognized as possible, to play out a recorded foreign language version of what the user selected. In Rondel et al, this selection is made by training the device to recognize the user's voice as a means for making the selection in his own language. This device can operate in only one foreign language unless restructured, and provides no means for questioning a respondent to determine what foreign language would be suitable for an interview. It is also structured to operate only with user voices that it recognizes, making it time consuming at best for a new user to begin using the translator on short notice.

SUMMARY OF THE INVENTION

The invention provides a translating machine to enable an operator who is fluent in one language to interview a respondent using a predetermined list of available sentences, which may include questions. This assumes that the respondent speaks any one of a plurality of available languages other than the language in which the operator is fluent, and also assumes that the respondent need not be literate in any language. Translations into each of the available languages of each of the available sentences are stored in advance in a digital form which is convertible into an audio waveform. The available language to be used with a particular respondent is chosen. The user selects individual desired sentences from an alphanumerically stored list which is visually presented to the user. Then, as selected by the user, a translation of the chosen sentences are played out in an audio form to the respondent.

These translations into individual foreign languages were obtained and stored in advance from speakers who were fluent in the individual languages. One of the available sentences is visually presented to the speaker for translation and his spoken translation is recorded. It is then played back for the speaker's approval, and if approved is accepted for long-term storage. If not approved, the speaker is given additional opportunities for recording his spoken translation until he is satisfied.

When the device is to be used to interview a potential respondent, if the language spoken by that respondent is uncertain, the user plays samples of seemingly probable languages to the respondent to determine which language the respondent chooses. The user then can limit future translations to a given respondent to a language which the given respondent has chosen from the samples. In general, digital audio sentences sufficient to conduct a medical interview in a large number of languages, approximating 25 or 30, can be stored on one CD-ROM disk of the size currently in wide use.

BRIEF DESCRIPTION OF THE DRAWINGS

FIG. 3 is a schematic block diagram of an element for use with the device of FIG. 1 for selecting which of a plurality of foreign languages a given respondent is familiar with.

DETAILED DESCRIPTION OF THE PREFERRED EMBODIMENT

When a physician wishes to interview a patient, as in an initial examination, there is a standard list of questions, almost a script, that covers most of what has to be asked. Lists of these phrases have long been available in Department of Defense phrase books referred to above. Other than "yes" or "no" answers in a foreign language, the physician will generally have difficulty understanding responses in the foreign language and must depend upon pointing, holding up a proper number of fingers for the answer, and other non-verbal responses.

Figure 1:
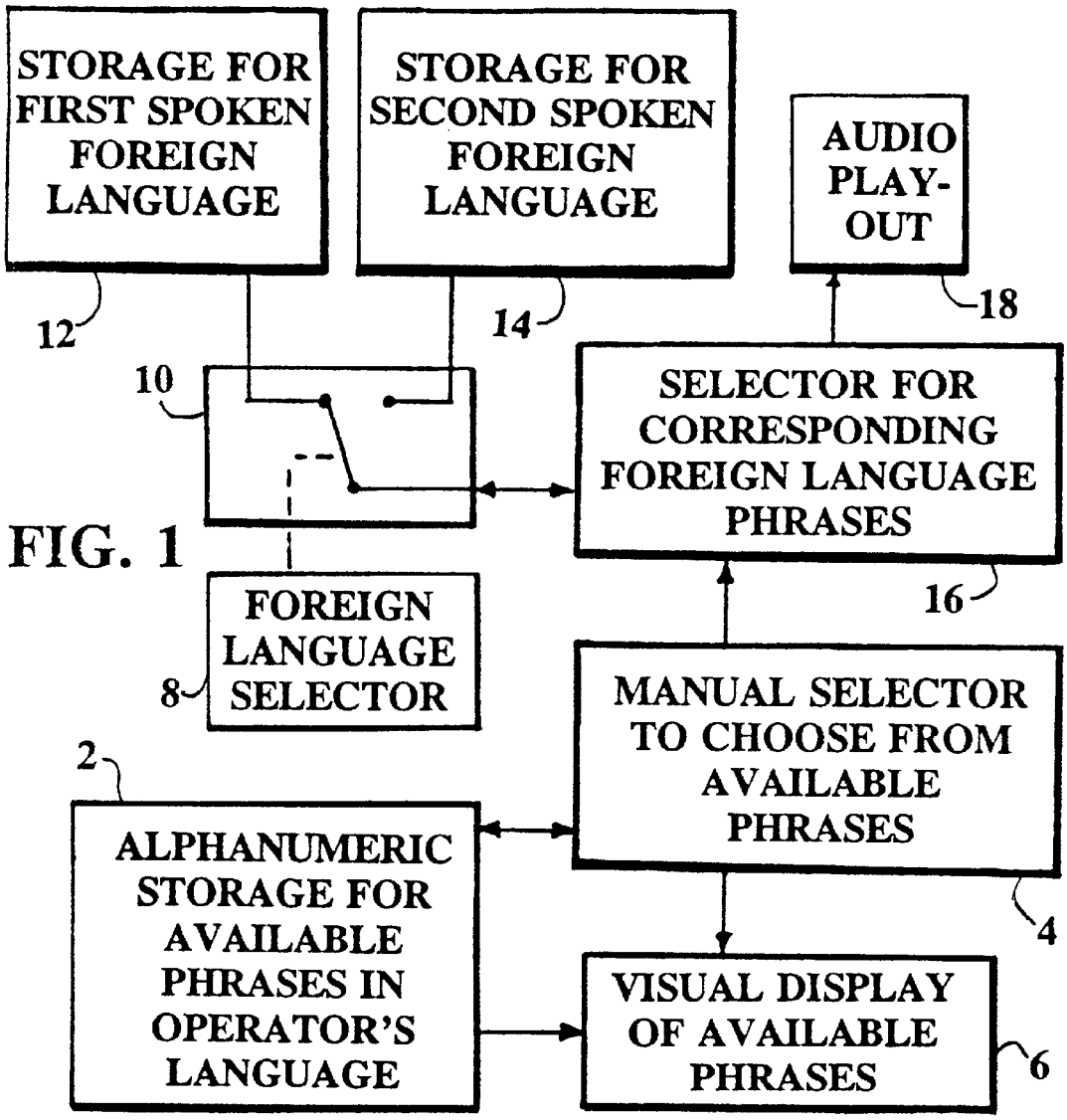
FIG. 1 is a schematic block diagram of a translating machine in accordance with the present invention

Referring to FIG. 1, which is a schematic block diagram of a translating machine in accordance with the present invention, a storage unit 2 stores an alphabetical list of available phrases in the operator/user's language, and it is possible to move about the available list through the use of a manual selector 4 which can choose among the various available phrases. The phrases available to choose from are displayed to the operator on a visual display of available phrases 6.

The precise method of manually selecting from the available phrases can be chosen from several. It is possible to do a word search by typing in a word such as "appendicitis" and have all available phrases using that word appear on the visual display in order to allow selection of a desired phrase. It is possible to choose, with a mouse or otherwise, from the available phrases being displayed on the visual display in order to select the desired phrase. It is possible to have a script containing a plurality of questions to be asked in sequence (or skipped) as desired for a particular procedure or interview, and to go down that script in order to select the desired phrase.

For the purposes of FIG. 1, it is assumed that, by this time, the foreign language to be used has been selected by operator, using a foreign language selector 8. This can also be operated from a keyboard or with a mouse. Selector 8 operates a logical switch 10, which chooses whether to take the stored spoken foreign language from a storage 12 for a first spoken foreign language, or a storage 14 for a second spoken foreign language.

The choice from the available phrases by the operator from selector 4 goes to a selector 16 for corresponding foreign language phrases. This selector, in connection with logical switch 10, chooses a recorded spoken phrase in the chosen foreign language (the first spoken foreign language with the switch as illustrated) and passes that recorded phrase to an audio playout device 18, where it is played out to be listened to by the respondent/patient.

Figure 2:
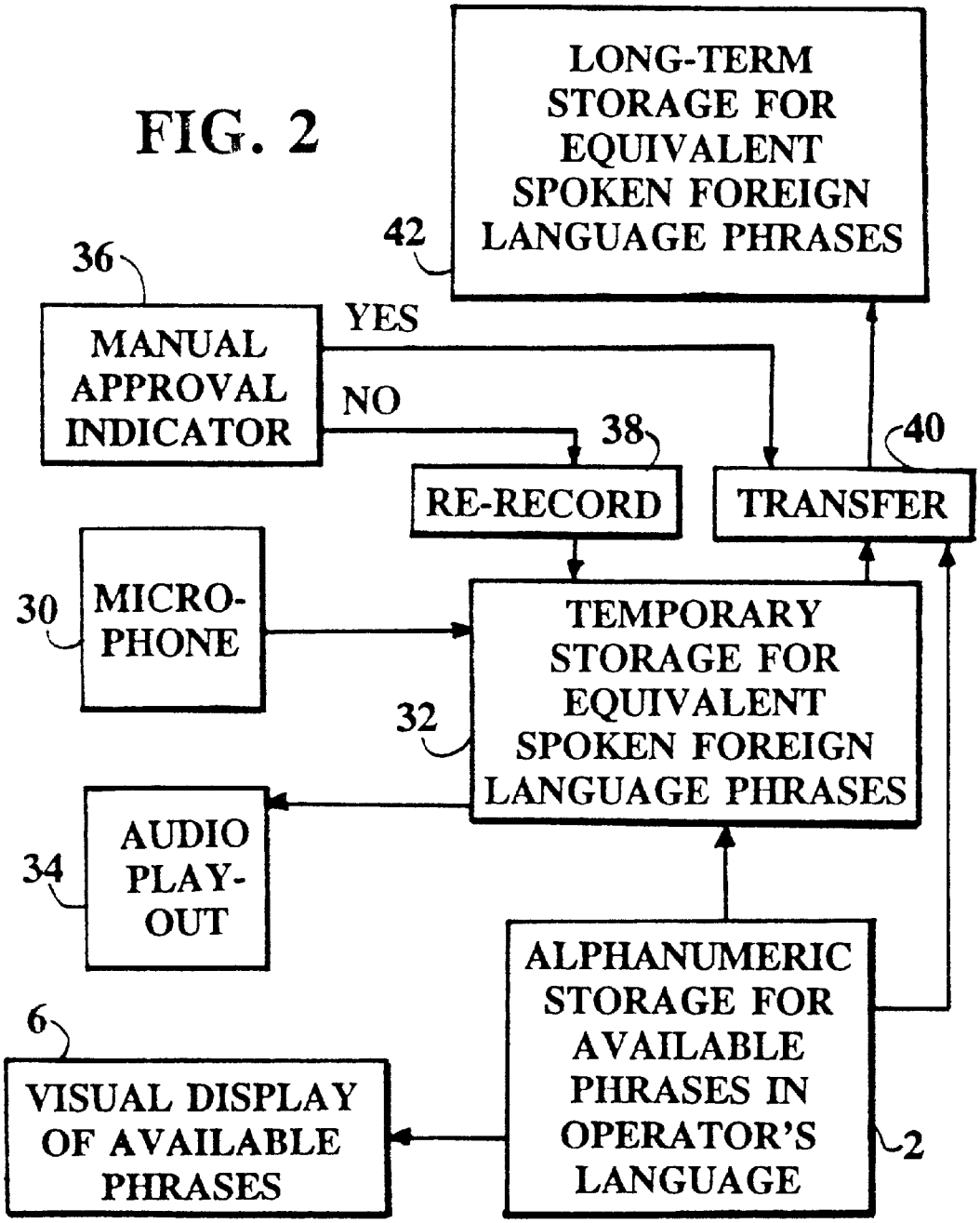
FIG. 2 is a schematic block diagram of a machine for recording a series of translations into a given foreign language.

Referring to FIG. 2, which is a schematic block diagram of a machine for recording translations of a series of phrases into a given foreign language, a storage unit 2 is provided for alphanumeric storage of available phrases in the operator's language. The phrases to be translated are presented to the person/speaker who will speak and record the translations on a visual display 6. This speaker is, of course, necessarily knowledgeable in the foreign language to be recorded, unlike the physician/user who is to be the ultimate user of the machine.

When a phrase is presented for translation on display 6, the speaker speaks the translation into microphone 30, from which it is taken and temporarily stored in a temporary storage unit 32 for equivalent spoken foreign language phrases. The recorded phrase is then played back on an audio playout device 34 for the approval of the speaker. The speaker indicates whether or not he approves the translation as played back on manual approval indicator 36. If he does not approve, a re-record control 38 causes the system to accept a new recording of the phrase from the speaker until he gets one he approves. If he does approve of the translation, a transfer control unit 40 causes the temporarily stored phrase from storage unit 32 to be transferred to long-term storage unit 42 for storage as an approved equivalent spoken foreign language phrase.

Figure 3:
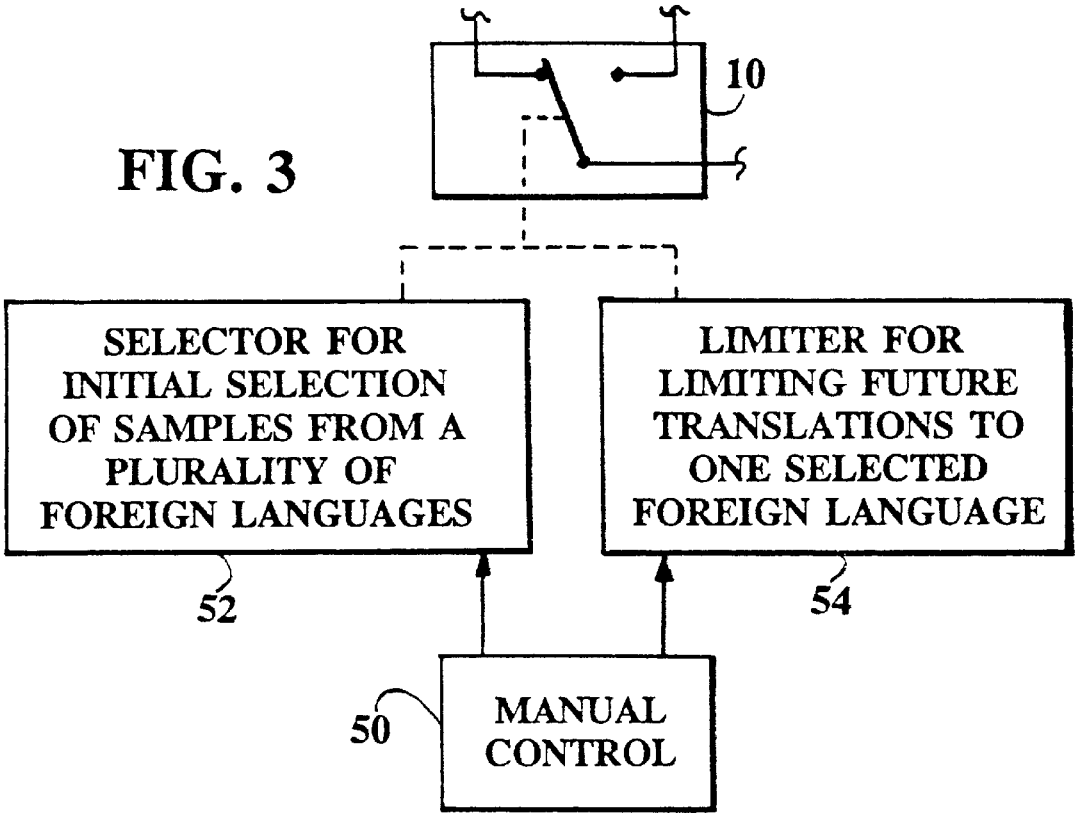
Figure 4:
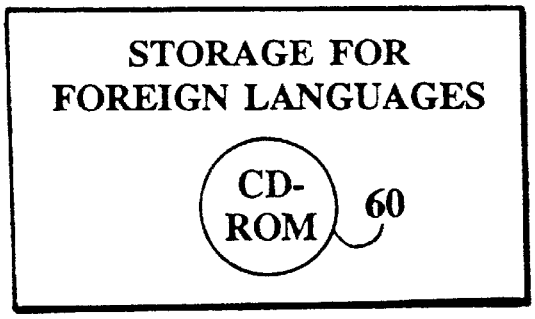
FIG. 4 is a schematic block diagram indicating that a plurality of foreign languages can be stored on and played back from a single CD-ROM.

Referring to FIG. 3, which is a schematic block diagram of an element for use with the device of FIG. 1 for selecting which of a plurality of recorded foreign languages a given respondent/patient is familiar with, foreign language selector 8 is shown in more detail in FIG. 3. When a respondent/patient is first presented for interview, if it is not clear what language the respondent understands, manual control 50 is operated to cause a selector 52 to make an initial selection of samples from a plurality of foreign languages. If, for example, a Navy ship picks up a person of oriental appearance from a raft in the ocean off southeast Asia, the operator might choose a series of languages such as Vietnamese, Laotian, Thai, Burmese, etc., to use in the first attempt to find the language of the respondent. In each language in sequence, selector 52 might ask, in that language, "Do you understand this language? If so, say yes." These questions would be played out to the respondent from the audio playout device 18 of FIG. 1. When a satisfactory language was arrived at, manual control 50 could be used to operate limiter 54 to limit future translations to the one selected foreign language which had been found satisfactory. While switch 10 is shown as a logical switch connected to sources for two foreign languages, many more foreign languages could be connected. When the foreign languages are stored on CD-ROM, as indicated in FIG. 4, phrases and sentences sufficient to conduct a medical interview in up to twenty-five or thirty different foreign languages can be stored on one CD-ROM disk 60, and, of course, a plurality of such disks can be used interchangeably.

It is perfectly possible to construct a special-purpose device containing all of the digital logic to carry out the functions of this invention. However, from the point of economy and ease of operation, the preferred embodiment of the invention uses a personal computer to carry out the function. The system used by the inventor is configured as follows:

An Austin 433VLI Winstation 486 computer with 20 megabytes RAM, two Maxtor hard disk drives respectively holding 130 megabytes and 220 megabytes, a CD drive and soundboard provided by Soundblaster Pro multimedia kit,,a Colorado Mountain Jumbo tape backup unit, an SVGA monitor, a Diamond Stealth video board with 1 megabyte of RAM, DOS version 5.0, Windows version 3.1, Norton Desktop version 2.0, WavaWav (Wave after Wave) version 1.5 (a shareware utility allowing sequential audio playback without using Windows) which is available from Ben Salido, 660 West Oak St., Hurst, Tex. 76053-5526, WAVE EDITOR version 1.03 (a shareware utility allowing wave editing, which displays waveform, allowing blocking of the part of a waveform to be retained, thereby reducing required memory, and also allowing amplitude adjustment) available from Keith W. Boone, 114 Broward St., Tallahasse, Fla. 32301, Sony SRS 27 speakers, ACE CAT 5-inch tablet for mouse, and Microsoft Visual Basic version 3.0.

Many variations on this configuration would be possible, but this is the configuration used by the inventor, which is known to be operable. The inventor uses computer programs in Visual Basic, operated under Windows, to run the system. Although these programs are made a part of the file of this application as originally filed, they are not considered to be essential to the invention per se. It is within the skill of those skilled in the art to write such programs as needed, and the programs themselves are not intended for printing with a patent resulting from this application.

When the foreign-language speaker is recording the initial translations, the newly recorded material is originally recorded in RAM, then after approval by speaker is transferred to a hard disk. When the complete set of phrases for a given language are successfully recorded, they are "harvested" from the hard disk and combined with sets of phrases from other languages for permanent recording on a CD-ROM disk. Eventually as many different CD-ROM disks as are needed can be used.

It may be advisable to record all the sample questions needed to find the language spoken by the respondent on one disk for all available languages, to reduce the need from frequent switching of disks as the language is located. It is also possible, when operating in an environment where perhaps five or fewer foreign languages will cover all of the potential respondents, to download those languages from a CD-ROM disk to a hard disk of perhaps 80 megabyte capacity, to avoid necessity of carrying a CD-ROM drive in a portable computer.

It is also desirable to provide the ability to keep a medical history by recording and later printing out a record of the questions asked and the physician's contemporaneous recording of the patient's responses to those question. The system also allows recording a series of phrases as used with one patient, then subsequently editing the phrases in the physician's language to derive a suitable set of phrases for use with later similar patients in any available language. This edited version can include comments which were later added by the editing physician to assist later users. Editing can be done by using the Windows integrated utility Notepad, or by using other word processors, or by using the program which has been written in Visual Basic.

What is claimed is:

1. A computer-based communications device for aiding communication between a user and a respondent, wherein the user and respondent do not speak a common language, the device comprising:

(a) a primary storage unit which stores an ordered list comprising discrete phrases in a language understood by the user;

(b) at least one secondary storage unit which stores digital pre-recorded audio translations to the discrete phrases stored in the primary storage unit in at least one language not fluently spoken by the user, said digital pre-recorded audio translations having been produced by translating the discrete phrases into the at least one language not spoken by the user to form translated discrete phrases, speaking each translated discrete phrase to form spoken translated discrete phrases, and recording each spoken translated discrete phrase;

(c) a visual display unit which displays a plurality of phrases from the ordered list;

(d) a phrase selector which allows the user to select a discrete phrase from the plurality of displayed phrases, wherein the phrase selector allows the user to scroll through the plurality of displayed phrases to select available phrases, retrieves a set of discrete phrases from said primary storage unit in response to a keyword input from said user, retrieves a script comprising a plurality of discrete phrases making up a structured interview in response to a script topic selection from said user, or a combination thereof, said phrase selector including an input device which controls movement of an on-screen indicator, said input device further including an actuator which, when activated while the on-screen indicator is at a position corresponding to that of a specific displayed, discrete phrase, selects the specific displayed, discrete phrase;

(e) a foreign language selector which allows the user to select a language for translation of the selected, displayed, discrete phrase;

(f) a software interface which allows the user to interact with various components of the device;

(g) an audio unit which plays out, from the digital pre-recorded audio translations stored on the at least one secondary storage unit, a translation in the user-selected foreign language of the selected, displayed, discrete phrase;

wherein said ordered list comprises predetermined phrases which solicit a universally comprehensible response from the respondent; and wherein the respondent need not be literate in the language of the pre-recorded audio translations to comprehend and respond to the discrete phrases.

2. The device of claim 1 which is a personal computer system.

3. The device of claim 2 which is portable.

4. The device of claim 2 wherein the primary storage unit is at least one hard disk.

5. The device of claim 2 wherein the at least one secondary storage unit is at least one CD-ROM.

6. The device of claim 2 wherein the software interface comprises a program written in visual basic.

7. The device of claim 2 wherein the video display unit is a video monitor.

8. The device of claim 2 wherein the audio unit comprises a sound card and at least one speaker.

9. The device of claim 2 wherein the foreign language selector and the phrase selector comprise a keyboard or a peripheral device that, when activated by the user, interacts, through said software interface, with said visual display to select the language for translation or the discrete phrase.

10. The device of claim 1 wherein the ordered list comprises discrete phrases ordered alphabetically, according to category, or a combination thereof.

11. The device of claim 1 wherein the at least one language is a plurality of languages.

12. The device of claim 1 wherein the primary storage unit and the at least one secondary storage unit comprise the same hardware.

13. The device of claim 1, wherein said ordered list of discrete phrases comprises predetermined phrases which solicit a yes response, a no response, a non-verbal response, or a non-verbal gesture from the respondent.

14. The device of claim 1 wherein the phrase selector retrieves a script comprising a plurality of discrete phrases forming a structured medical interview in response to a script topic selection from the user.

15. The device of claim 14 wherein the structured interview is a standard medical interview.

16. The device of claim 15 wherein the standard medical interview is about at least one specific medical condition or ailment.

17. A method for a medical practitioner to interview a patient using the computer-based communications device of claim 1, wherein the patient does not understand any language spoken fluently by the doctor; the method comprising the steps of:

(a) selecting a phrase;

(b) selecting a foreign language to audibly present a translation of the phrase selected for the patient;

(d) determining whether the patient understood the translation;

(e) repeating steps (b) and (c) until a foreign language which the patient understands is found;

(f) selecting a script comprising a structured interview appropriate to medically interview the patient.

* * * * *